US012786761B2

(12) United States Patent
Wei et al.

(10) Patent No.: US 12,786,761 B2
(45) Date of Patent: Nov. 3, 2026

(54) CLIENT STATION TO CLIENT STATION SENSING

(71) Applicant: NXP USA, Inc., Austin, TX (US)

(72) Inventors: Dong Wei, Austin, TX (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 824 days.

(21) Appl. No.: 18/149,423

(22) Filed: Jan. 3, 2023

(65) Prior Publication Data

US 2024/0015541 A1 Jan. 11, 2024

Related U.S. Application Data

(60) Provisional application No. 63/367,877, filed on Jul. 7, 2022.

(51) Int. Cl.
*H04W 24/08* (2009.01)
*H04W 24/10* (2009.01)
*H04W 84/12* (2009.01)

(52) U.S. Cl.
CPC ........... *H04W 24/08* (2013.01); *H04W 24/10* (2013.01); *H04W 84/12* (2013.01)

(58) Field of Classification Search
None
See application file for complete search history.

(56) References Cited

U.S. PATENT DOCUMENTS

2022/0053560 A1* 2/2022 Xin ................... H04W 28/0268
2023/0009140 A1* 1/2023 Trainin ................. H04W 24/02
2024/0187189 A1* 6/2024 Pushkarna ............ H04L 5/0057
2024/0292262 A1* 8/2024 Kim ....................... H04W 24/08
2024/0324033 A1* 9/2024 Gao ....................... H04W 76/10
2024/0357329 A1* 10/2024 Gao ....................... H04W 24/10
2024/0406990 A1* 12/2024 Pushkarna ............ H04L 5/0053
(Continued)

FOREIGN PATENT DOCUMENTS

WO WO-2021256830 A1 * 12/2021 ............. H04B 17/24
WO WO-2023193265 A1 * 10/2023 ............ H04W 24/08
WO WO-2023211367 A2 * 11/2023 ............ H04W 84/12

OTHER PUBLICATIONS

A. Sahoo, "STA-STA WLAN Sensing: Scenarios and Signaling", document IEEE 802.11-22/0549; Mar. 2022; 20 pages.
(Continued)

*Primary Examiner* — Peter P Chau

(57) ABSTRACT

One example discloses an access point (AP) device for use within a wireless local area network (WLAN), including: a controller configured to send a client-to-client sounding subvariant sensing trigger frame (TF) over the WLAN to first client station (STA1) device and a second client station (STA2) device; wherein the STA1 is configured to send a sensing message in response to receiving the client-to-client sounding subvariant sensing TF; wherein the AP controller is configured to send a reporting subvariant sensing TF to the STA2 after the sensing message is sent by the STA1; wherein the STA2 is configured to send a measurement report frame to the AP in response to receiving the reporting subvariant sensing TF; and wherein the measurement report frame includes a set of channel state information (CSI) that characterizes a WLAN channel between the STA1 and the STA2.

14 Claims, 5 Drawing Sheets

(56) References Cited

U.S. PATENT DOCUMENTS

| | | | | |
|---|---|---|---|---|
| 2025/0113229 | A1* | 4/2025 | Kim | H04W 12/08 |
| 2025/0212038 | A1* | 6/2025 | Dong | G01S 5/00 |
| 2025/0301354 | A1* | 9/2025 | Pushkarna | H04W 76/14 |
| 2025/0338310 | A1* | 10/2025 | Lim | H04W 74/0808 |

OTHER PUBLICATIONS

E. Rantala, et al., "STA-STA sub7GHZ WLAN sensing support by leveraging SBP", document IEEE 802.11-22/0339; Mar. 2022; 8 pages.

IEEE P802.11bf™/DO.1 Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Enhancements for Wireless LAN Sensing; Apr. 2022; 89 pages.

S. Kim, et al., "Collaborative WLAN Sensing—Definition and Operational Scenarios", document IEEE 802.11-21/1926; Nov. 2021; 15 pages.

S. Kim, et al., "Collaborative WLAN Sensing—Example Operations", document IEEE 802.11-22/0312; Feb. 2022; 15 pages.

S. Kim, et al., "Collaborative WLAN Sensing—Follow Ups", document IEEE 802.11-21/0145; Mar. 2021; 19 pages.

S. Kim, et al., "Collaborative WLAN Sensing", document IEEE 802.11-20/1533; Sep. 2020; 13 pages.

* cited by examiner

CLIENT STATION TO CLIENT STATION SENSING

REFERENCE TO PROVISIONAL APPLICATION TO CLAIM PRIORITY

A priority date for this present U.S. patent application has been established by prior U.S. Provisional Patent Application, Ser. No. 63/367,877, entitled "A Method For Client-To-Client Sensing In Wireless Local Area Networks", filed on 7 Jul. 2022, and commonly assigned to NXP USA, Inc.

The present specification relates to systems, methods, apparatuses, devices, articles of manufacture and instructions for client station to client station sensing.

SUMMARY

According to an example embodiment, an access point (AP) device for use within a wireless local area network (WLAN), comprising: a controller configured to send a client-to-client sounding subvariant sensing trigger frame (TF) over the WLAN to first client station (STA1) device and a second client station (STA2) device; wherein the STA1 is configured to send a sensing message in response to receiving the client-to-client sounding subvariant sensing TF; wherein the AP controller is configured to send a reporting subvariant sensing TF to the STA2 after the sensing message is sent by the STA1; wherein the STA2 is configured to send a measurement report frame to the AP in response to receiving the reporting subvariant sensing TF; and wherein the measurement report frame includes a set of channel state information (CSI) that characterizes a WLAN channel between the STA1 and the STA2.

In another example embodiment, the STA2 is configured to receive the sensing message and perform sensing measurement using the message.

In another example embodiment, the sensing message includes a null-data packet (NDP).

In another example embodiment, the NDP indicates to the STA2 that a sensing measurement is in progress.

In another example embodiment, the CSI from the STA2 only includes channel state information between the STA1 and the STA2.

In another example embodiment, the STA1 and the STA2 are non-AP client stations.

In another example embodiment, the client-to-client sounding subvariant sensing TF is received by a set of client stations that include the STA1 and the STA2.

In another example embodiment, the reporting subvariant is received by a set of client stations that include the STA2 but that do not include the STA1.

In another example embodiment, the measurement report frame is sent by a set of client stations that include STA2 but that do not include STA1.

In another example embodiment, the controller is configured to send a poll subvariant sensing TF, from the AP to the STA1 and the STA2, that sets the STA1 and the STA2 to either send the sensing message, receive the sensing message, or both send and receive the sensing message.

In another example embodiment, the sensing message is configured to cause the AP to forward the channel state information (CSI) that characterizes the WLAN channel between the STA1 and the STA2 to a third client station device (STA3).

In another example embodiment, the CSI includes at least one of a channel: attenuation, propagation delay, or distortion.

In another example embodiment, the client-to-client sounding subvariant sensing TF and the reporting subvariant sensing TF are indicated by a Sensing Trigger Subtype field in a general sensing TF transmitted by the controller of the AP.

In another example embodiment, the client-to-client sounding subvariant sensing TF is indicated in the sensing trigger subtype field; and the client-to-client sounding subvariant sensing TF assigns STA1 as a sensing transmitter using a user info field and assigns STA2 as a sensing receiver using another user info field.

According to an example embodiment, a first client station (STA1) device for use within a wireless local area network (WLAN), comprising: a controller configured to send a sensing message in response to a client-to-client sounding subvariant sensing trigger frame (TF) from an access point (AP); wherein the controller is configured to send the sensing message over the WLAN; wherein the sensing message is configured to signal the AP to send a reporting subvariant sensing TF that commands a second client station (STA2) to send a measurement report frame to the AP; and wherein the measurement report frame includes a set of channel state information (CSI) that characterizes a WLAN channel between the STA1 and the STA2.

In another example embodiment, the sensing message is configured to signal the STA2 to receive the message and perform sensing measurement using the message.

In another example embodiment, the sensing message includes a null-data packet (NDP).

In another example embodiment, the controller in the STA1 is configured to transmit a request to the AP to send the client-to-client sounding subvariant sensing TF.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
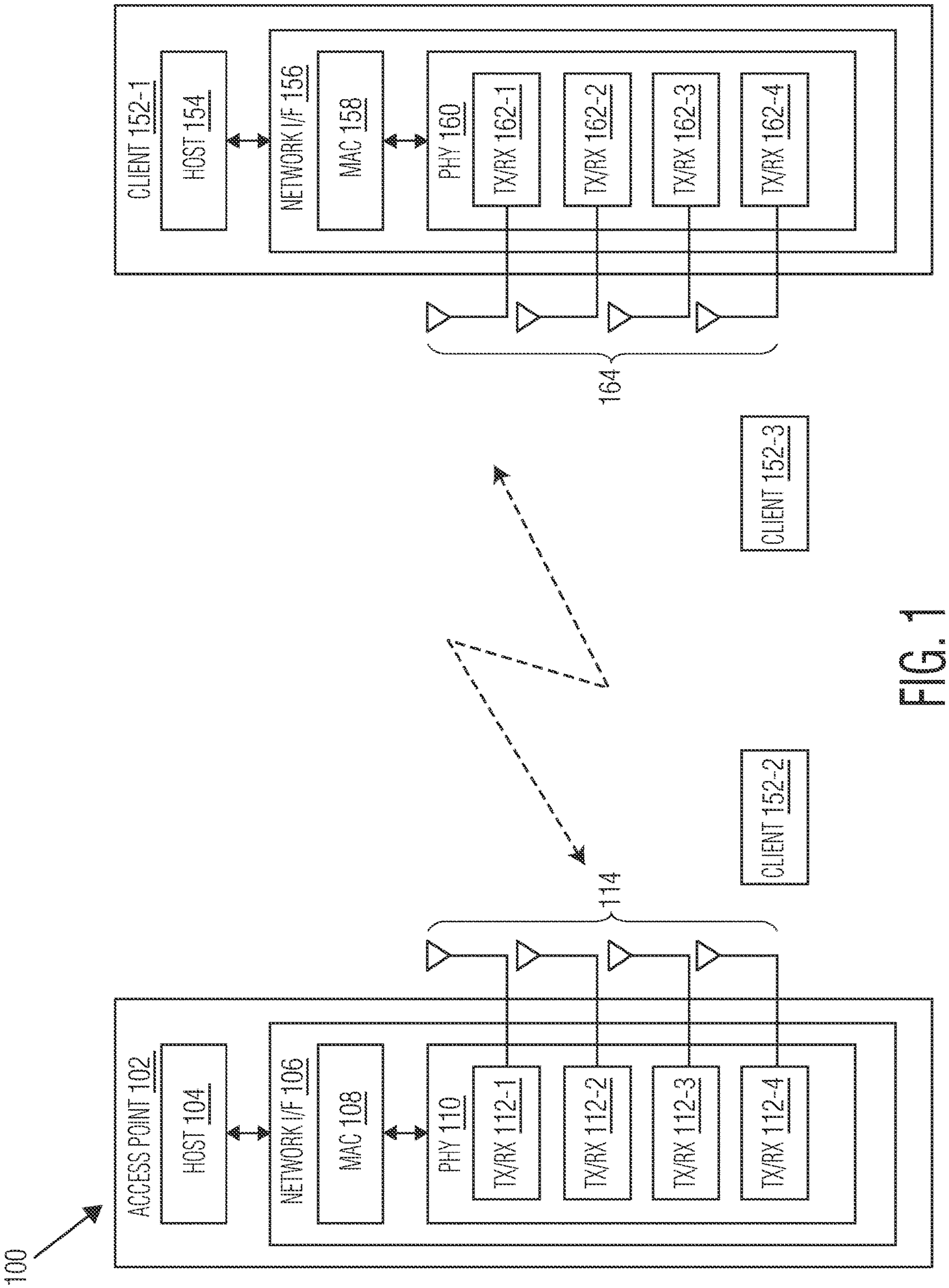
FIG. 1 represents an example wireless communications network (WLAN) formed by a set of wireless communications devices.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

IEEE (Institute of Electrical and Electronics Engineers) 802 defines communications standards for various networked devices (e.g. Local Area Networks (LAN), Metropolitan Area Networks (MAN), etc.). IEEE 802.11 further defines communications standards for Wireless Local Area Networks (WLAN). As such, communications on these networks must, by agreement, follow one or more communications protocols so that various network devices can communicate. These protocols are not static and are modified (e.g. different generations) over time, typically to improve communications robustness and increase throughput.

In embodiments of a wireless communication network described below, a wireless communications device such as an access point (AP) of a wireless local area network (WLAN) transmits data streams to one or more client stations (STAs). The AP and STAs communicate using one or more communication protocols. These protocols may include IEEE protocols such as: 802.11b; 802.11g; 802.11a; 802.11n [i.e. HT (High Throughput) with Single-User Multiple-Input Multiple-Output (SU-MIMO)]; 802.11ac [i.e. VHT (Very High Throughput) with downlink Multi-User MIMO (MU-MIMO)]; 802.11ax [i.e. HE (High Efficiency) operating at both 2.4- and 5-GHz bands, including OFDMA (Orthogonal Frequency Division Multiple Access) and MU-MIMO with uplink scheduling]; and 802.11 be [i.e. EHT (Extra High Throughput) operating at 2.4 GHz, 5 GHz, and 6 GHz frequency bands and a much wider 320 MHz bandwidth]. In various example embodiments, one or more APs may be affiliated into a logical AP group and/or one or more STAs may be affiliated into a logical STA group.

FIG. 1 represents an example 100 wireless communications network (WLAN) formed by a set of wireless communications devices (i.e. APs and STAs). The WLAN 100 includes access point (AP) 102 and a set of client stations (STAs) 152-1, 152-2, and 152-3.

The AP 102 includes host processor 104 coupled to network interface 106. Host processor 104 includes a processor configured to execute machine readable instructions stored in a memory device (not shown), e.g., random access memory (RAM), read-only memory (ROM), a flash memory, or other storage device.

Network interface 106 includes medium access control (MAC) processor/controller 108 and physical layer (PHY) processor/controller 110. In some example embodiments the MAC processor 108 operates at the data-link layer of the OSI (Open Systems Interconnection) model and the PHY processor 110 operates at the physical layer of the OSI model.

The PHY processor 110 includes a plurality of transceivers 112-1, 112-2, 112-3, and 112-4, each of which is coupled to a corresponding antenna of antennas 114. These antennas 114 can support MIMO functionality. Each of transceivers 112-1, 112-2, 112-3, and 112-4 includes a transmitter signal path and a receiver signal path, e.g., mixed-signal circuits, analog circuits, and digital signal processing circuits for implementing radio frequency and digital baseband functionality. The PHY processor 110 may also include an amplifier (e.g., low noise amplifier or power amplifier), a data converter, and circuits that perform discrete Fourier transform (DFT), inverse discrete Fourier transform (IDFT), modulation, and demodulation, thereby supporting OFDMA modulation.

The client STAs 152-1, 152-2, and 152-3 each include similar circuits (e.g., host processor 154, network interface 156, MAC processor 158, PHY processor 160, transceivers 162-1, 162-2, 162-3, and 162-4, and antennas 164) that provide similar functionality to that of AP 102 but are adapted to client-side specifications.

The MAC 108, 158 and PHY 110, 160 processors within the AP 102 and STA 152-1 exchange PDUs (Protocol Data Units) and SDUs (Service Data Units) in the course of managing the wireless communications traffic. The PHY processor is configured to receive MAC layer SDUs.

As part of Wireless Local Area Network (WLAN) channel sounding process (e.g. IEEE 802.11bf), various sensing measurements are made so as to measure the wireless channels between an access point (AP) and a set of client stations (STAs).

These sensing measurements yield channel state information (CSI) between the AP and STAs. CSI is well defined in the WLAN standard and is used to retrieve attributes such as attenuation, propagation delay, distortion, etc. that monitors the environment over time. Some WLAN sounding devices, procedures, protocols, and signaling required the AP to initiate and obtain these CSI measurements.

Now discussed are devices, procedures, protocols, and signaling for sounding that are initiated by and/or measured directly between one or more STAs instead of the AP and that can, for example, be applied to the IEEE 802.11bf standard for WLAN sensing. The IEEE 802.11bf is different from IEEE 802.11 be standard for wireless data communication.

This client-to-client sensing employs an AP trigger frame-based sensing procedure for measuring wireless CSI directly between two or more clients (e.g. STAs, non-AP stations, etc.). Such between STA channel information lays a foundation for client-to-client (e.g. STA-to-STA) direct communication.

Figure 2:
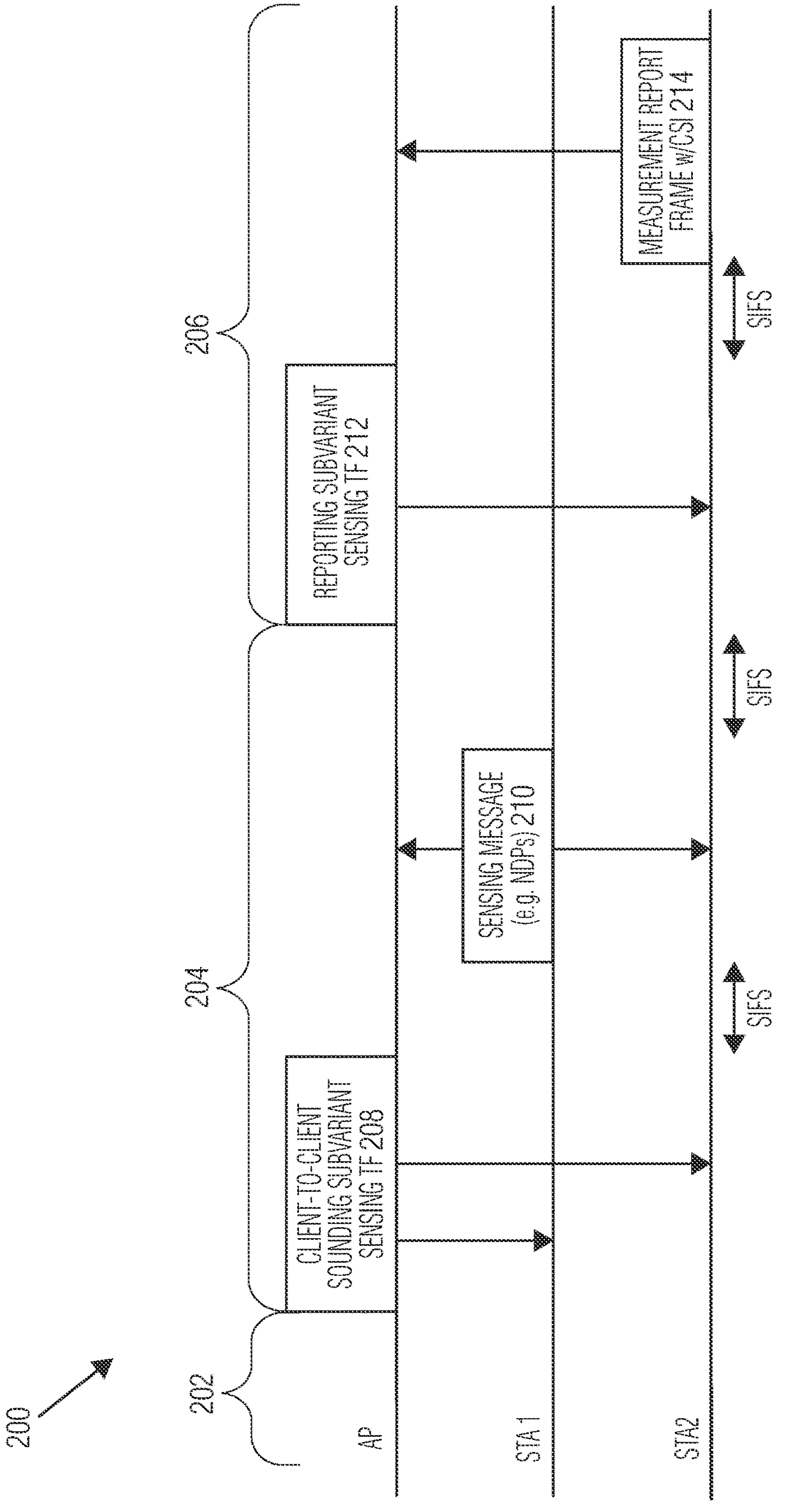
FIG. 2 represents a first example set of message exchanges for client-to-client (e.g. STA-to-STA) sounding (i.e. sensing).

FIG. 2 represents a first example set of message exchanges 200 for client-to-client (e.g. STA-to-STA) sounding (i.e. sensing). The first example 200 includes an access point (AP), a first client station device (STA1), a second client station device (STA2), a sensing polling phase 202 (optional), a client-to-client sounding phase 204, and a reporting phase 206.

In this example embodiment, a set of channel state information (CSI) between the clients (e.g. STA1 and STA2) is being measured. Note that sounding and sensing herein are used interchangeably. Also note that in other example embodiments, more than two STAs may be present, and the protocol now being discussed can be scaled accordingly to the other STAs.

The sensing polling phase 202 includes a poll subvariant sensing TF (not shown). The client-to-client sounding phase 204 includes a client-to-client sounding subvariant sensing TF 208 and a sensing message 210. The reporting phase 206 includes a reporting subvariant sensing TF 212, and a measurement report frame 214 that includes channel state information (CSI) for the STA1 to STA2 channel. In various example embodiments, a SIFS (short inter-frame space) is between each of the frames and messages.

The format of a subtype field in the sensing TF indicates which subvariant of the sensing TF is being transmitted (e.g. poll subvariant, sounding subvariant, reporting subvariant, client-to-client sounding subvariant, etc.)

In the sensing polling phase 202, the AP is configured to transmit a poll subvariant sensing TF (not shown) to the clients to receive their client-to-client sounding/sensing availability. In some example embodiments, the clients agree to participate in the client-to-client sounding/sensing measurement by responding with a CTS-to-self message (not shown).

The AP is configured to facilitate negotiation and agreement of each clients' roles in the sounding/sensing measurement procedure. Such client roles include: sending the sensing message 210, receiving the sensing message 210, or both sending and receiving the sensing message 210.

Once the sensing polling phase 202 is completed, the AP is configured to include the role of every participating client in the user info field of the sensing TFs. For example, one of the bits in the user info field is used to indicate whether a particular client STA is a sensing message transmitter or a sensing message receiver.

In the client-to-client sounding phase 204, the AP is configured to transmit a client-to-client sounding subvariant sensing TF 208 that instructs the STA1 to transmit the sensing message 210. In some example embodiments, the sensing message 210 is one null-data packet (NDP). The NDP in various example embodiments does not have any address and has the format of a High-Efficiency Ranging NDP.

The AP and every client that is a sensing receiver (e.g. STA2) playing a role in the sounding/sensing measurement procedure receives the sensing message 210. The STA2 uses reception of the sensing message 210 to measure CSI between the STA1 and the STA2. The AP may optionally use reception of the sensing message 210 to measure CSI between the STA1 and the AP.

In the reporting phase 206, the reporting subvariant sensing TF 212 is transmitted by the AP to instructs the STA2 to transmit the measurement report frame 214 containing channel state information (CSI) for the STA1 to STA2 WLAN channel back to the AP.

In various example embodiments during sounding/sensing, only one STA (e.g. STA1) is configured to transmit the sensing message 210, however, any number of STAs or APs can be configured to receive the sensing message 210.

While in many example embodiments, the AP is configured to initiate the STA-to-STA sounding/sensing process, in other example embodiments, the AP can periodically poll the STAs for any request by the STAs for the sounding/sensing process to be initiated. For example, a third client (e.g. STA3) can send a request to the AP to ask the AP to measure CSI for the channel between STA1 to STA2, where STA1, STA2 and STA3 are all non-AP stations. The AP then initiates a client-to-client sensing measurement (as described above) between STA1 and STA2 and afterwards, forwards the measurement report from STA2 to STA3.

In another example, STA2 wants CSI for the channel between STA1 and STA2 and so sends a request to the AP to initiate client-to-client sensing measurement (as described above) between STA1 and STA2. After the measurement, STA2 many then just keep the measurement report's CSI for itself and not transmit the measurement report frame 214 back to the AP.

Figure 3:
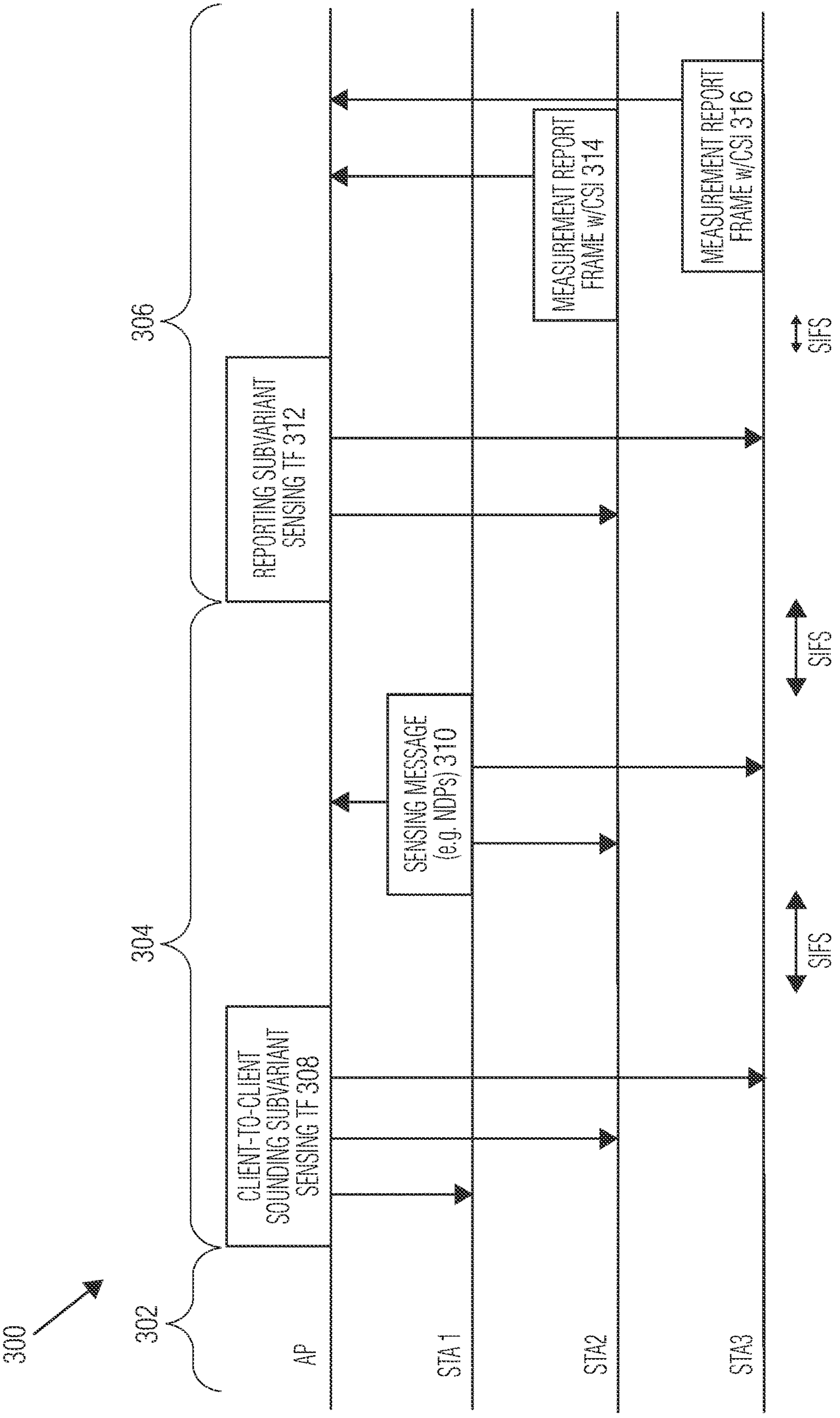
FIG. 3 represents a second example set of message exchanges for client-to-client sounding.

FIG. 3 represents a second example set of message exchanges 300 for client-to-client sounding. The second example 300 includes an access point (AP), a first client station device (STA1), a second client station device (STA2), a third client station device (STA3), a sensing polling phase 302 (optional), a client-to-client sounding phase 304, and a reporting phase 306.

The sensing polling phase 302 includes a poll subvariant sensing TF (not shown). The client-to-client sounding phase 304 includes a sounding subvariant sensing TF 308 and a sensing message 310. The reporting phase 306 includes a reporting subvariant sensing TF 312, and measurement report frame 314, 316 that respectively includes channel state information (CSI) for the STA1 to STA2 channel, and for the STA1 to STA3 channel. Thus client-to-client sensing measurements can also be performed with more than two clients.

The client-to-client sounding phase 304 includes of the following steps. The AP first transmits the client-to-client sounding subvariant sensing TF 308 to all three stations to indicate their roles in the current client-to-client sounding phase of sensing measurement. STA1 is the sensing transmitter and both STA2 and STA3 are the sensing receivers. SIFS after receiving the sounding subvariant sensing TF 308, STA1 transmits the sensing message 310 (e.g. NDP).

The AP, STA2 and STA3 receive the sensing message 310 (e.g. NDP). Using the received sensing message 310 (e.g. NDP), the AP may measure the wireless channel from STA1 to the AP. Using the received sensing message 310 (e.g. NDP), STA2 and STA3 measure the wireless channels from STA1 to STA2 and STA3, respectively.

The reporting phase 306 includes of the following steps. SIFS after receiving the sensing NDP, the AP transmits the reporting subvariant sensing TF 312 to STA2 and STA3 to solicitate channel measurement results. The TF assigns resources to the stations for their transmissions of channel measurement results. SIFS after receiving the reporting subvariant sensing TF 312, both STA2 and STA3 transmit their respective sensing measurement report frames 314 and 316 to the AP. The frames 314 and 316 contain the measured channels from STA1 to STA2 and STA3, respectively.

Figure 4:
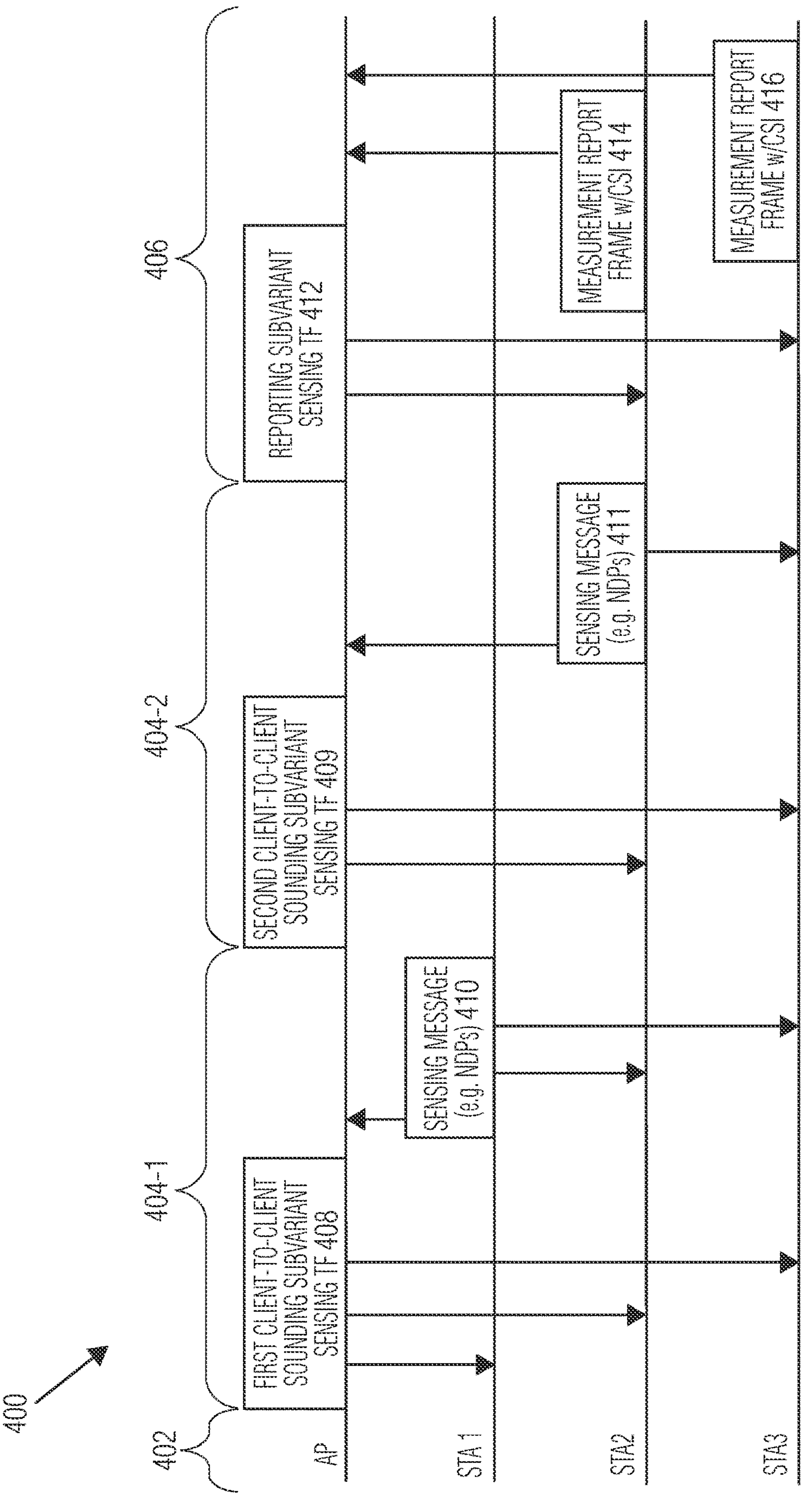
FIG. 4 represents a third example set of message exchanges for client-to-client sounding.

FIG. 4 represents a third example set of message exchanges 400 for client-to-client sounding. The third example 400 includes an access point (AP), a first client station device (STA1), a second client station device (STA2), a third client station device (STA3), a sensing polling phase 402 (optional), two client-to-client sounding phases 404-1 and 404-2, and a reporting phase 406.

The sensing polling phase 402 includes a poll subvariant sensing TF (not shown). The first client-to-client sounding phase 404-1 includes a first client-to-client sounding subvariant sensing TF 408 and a first sensing message 410. The second client-to-client sounding phase 404-2 includes a second client-to-client sounding subvariant sensing TF 409 and a second sensing message 411. The reporting phase 406 (optional in some example embodiments) includes a reporting subvariant sensing TF 412, and measurement report frames 414, 416 that respectively includes channel state information (CSI) for the STA1 to STA2 channel, and for the STA1 to STA3 channel and the STA2 to STA3 channel. Thus client-to-client sensing measurements can also be performed with more than two clients.

The third example 400 includes the APs transmission of two client-to-client sounding subvariant sensing TFs 408, 409. The wireless channels from STA1 to STA2, from STA1 to STA3, and from STA2 to STA3 are to be measured.

The AP first transmits a first client-to-client sounding subvariant sensing TF 408 to all three stations to indicate their roles in the current client-to-client sounding phase 404-1 of sensing measurement. In this client-to-client sounding phase 404-1, STA1 is the sensing transmitter and both STA2 and STA3 are the sensing receivers. SIFS after receiving the first client-to-client sounding subvariant sensing TF 408, STA1 transmits the first sensing message 410 (e.g. NDP).

The AP, STA2 and STA3 receive the first sensing message 410 (e.g. NDP). Using the received first sensing message 410 (e.g. NDP), the AP may measure the wireless channel from STA1 to the AP. Using the received first sensing message 410 (e.g. NDP), STA2 and STA3 measure the wireless channels from STA1 to STA2 and STA3, respectively.

The AP then transmits a second client-to-client subvariant sensing TF 409 to STA2 and STA3 to indicate their roles. In this next client-to-client sounding phase of sensing measurement STA2 is the sensing transmitter and STA3 is the sensing receiver. SIFS after receiving the second client-to-client sounding subvariant sensing TF 409, STA2 transmits the second sensing message 411 (e.g. NDP).

The AP and STA3 receive the second sensing message 411 (e.g. NDP). Using the received second sensing message 411 (e.g. NDP), the AP may measure the wireless channel from STA2 to the AP. Using the received second sensing message 411 (e.g. NDP), STA3 measures the wireless channels from STA2 to STA3.

The reporting phase 406 includes of the following steps. SIFS after receiving the second sensing message 411 (e.g. NDP), the AP transmits the reporting subvariant sensing TF 412 to STA2 and STA3 to solicit their respective channel measurement results. The TF assigns resources to STA2 and STA3 for their transmissions of channel measurement results. SIFS after receiving the reporting subvariant sensing TF 412, both STA2 and STA3 transmit their respective sensing measurement report frames 414, 416 to the AP. The frame 414 sent by STA2 contains the measured channels from STA1 to STA2. The frame 416 sent by STA3 contains the measured channels from STA1 and STA2 to STA3, respectively.

Figure 5:
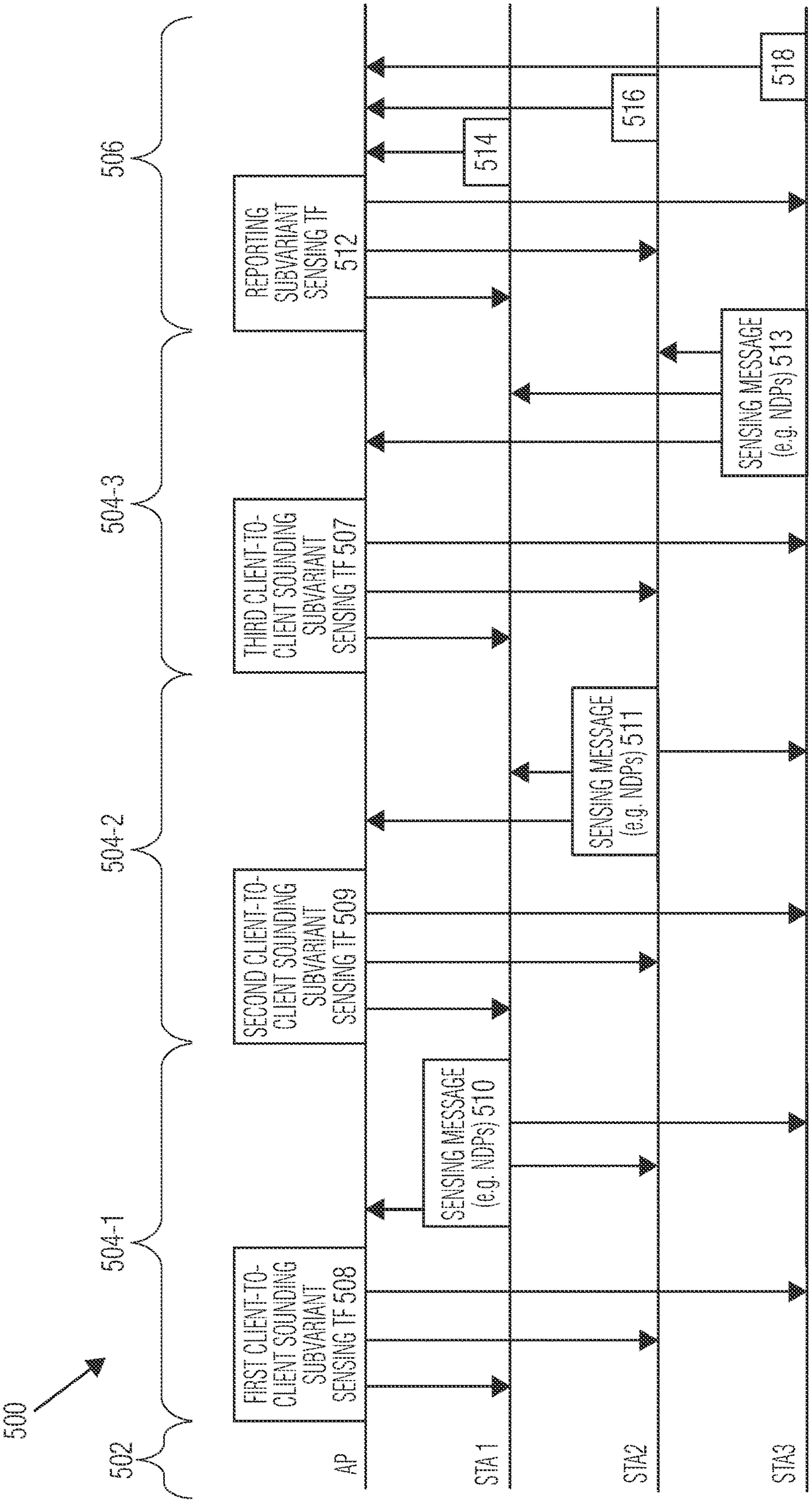
FIG. 5 represents a fourth example set of message exchanges for client-to-client sounding.

FIG. 5 represents a fourth example set of message exchanges 500 for client-to-client sounding. The fourth example 500 includes an access point (AP), a first client station device (STA1), a second client station device (STA2), a third client station device (STA3), a sensing polling phase 502 (optional), three client-to-client sounding phases 504-1, 504-2, and 504-3, and a reporting phase 506.

The sensing polling phase 502 includes a poll subvariant sensing TF (not shown). The first client-to-client sounding phase 504-1 includes a first client-to-client sounding subvariant sensing TF 508 and a first sensing message 510 (e.g. NDP). The second client-to-client sounding phase 504-2 includes a second client-to-client sounding subvariant sensing TF 509 and a second sensing message 511 (e.g. NDP). The third client-to-client sounding phase 504-3 includes a third client-to-client sounding subvariant sensing TF 507 and a third sensing message 513 (e.g. NDP). The reporting phase 506 (optional in some example embodiments) includes a reporting subvariant sensing TF 512, and measurement report frames 514, 516, 518.

In this example 500, multi-directional CSI measurements are made, such as the bidirectional wireless channels between STA1, STA2 and STA3.

The AP first transmits the first client-to-client sounding subvariant sensing TF 508 to all three stations to indicate their roles in the current client-to-client sounding phase 504-1 of sensing measurement: STA1 is the sensing transmitter and both STA2 and STA3 are the sensing receivers. SIFS after receiving the first client-to-client sounding subvariant sensing TF 508, STA1 transmits the first sensing message 510 (e.g. NDP).

The AP, STA2 and STA3 receive the first sensing message 510 (e.g. NDP). Using the received first sensing message 510 (e.g. NDP), the AP may measure the wireless channel from STA1 to the AP. Using the received first sensing message 510 (e.g. NDP), STA2 and STA3 measure the wireless channels from STA1 to STA2 and STA3, respectively.

The AP then transmits a second client-to-client sounding subvariant sensing TF 509 to all three stations to indicate their roles in the current client-to-client sounding phase 504-2 of sensing measurement: STA2 is the sensing transmitter and both STA1 and STA3 are the sensing receivers. SIFS after receiving the second client-to-client sounding subvariant sensing TF 509, STA2 transmits the second sensing message 511 (e.g. NDP).

The AP, STA1 and STA3 receive the second sensing message 511 (e.g. NDP). Using the received second sensing message 511 (e.g. NDP), the AP may measure the wireless channel from STA2 to the AP. Using the received second sensing message 511 (e.g. NDP), STA1 and STA3 measure the wireless channels from STA2 to STA1 and STA3, respectively.

The AP then transmits a third client-to-client sounding subvariant sensing TF 507 to all three stations to indicate their roles in the current client-to-client sounding phase 504-3 of sensing measurement: STA3 is the sensing transmitter and both STA1 and STA2 are the sensing receivers. SIFS after receiving a third client-to-client sounding subvariant sensing TF 507, STA3 transmits the third sensing message 513 (e.g. NDP).

The AP, STA1 and STA2 receive the third sensing message 513 (e.g. NDP). Using the received third sensing message 513 (e.g. NDP), the AP may measure the wireless channel from STA3 to the AP. Using the received third sensing message 513 (e.g. NDP), STA1 and STA2 measure the wireless channels from STA3 to STA1 and STA2, respectively.

The reporting phase 506 includes of the following steps. SIFS after receiving the third sensing message 513 (e.g. NDP), the AP transmits the reporting subvariant sensing TF 512 to all three stations to solicit their respective channel measurement results. The reporting subvariant sounding sensing TF 512 assigns resources to the stations for their transmissions of channel measurement results.

SIFS after receiving the reporting subvariant sensing TF 512, all three stations transmit their sensing measurement report frames 514, 516, 518 to the AP. The frame 514 sent by STA1 contains the measured channels from STA2 and STA3 to STA1, respectively. The frame 516 sent by STA2 contains the measured channels from STA1 and STA3 to STA2, respectively. The frame 518 sent by STA3 contains the measured channels from STA1 and STA2 to STA3, respectively.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. An access point (AP) for use within a wireless local area network (WLAN), comprising:

a controller circuit configured to send a client-to-client sounding subvariant sensing trigger frame (TF) over the WLAN to first client station (STA1) and a second client station (STA2);

wherein the STA1 is configured to send a sensing message in response to receiving the client-to-client sounding subvariant sensing TF;

wherein the controller circuit is configured to send a reporting subvariant sensing TF to the STA2 after the sensing message is sent by the STA1;

wherein the STA2 is configured to send a measurement report frame to the AP in response to receiving the reporting subvariant sensing TF;

wherein the measurement report frame includes a set of channel state information (CSI) that characterizes a WLAN channel between the STA1 and the STA2;

wherein the controller circuit is configured to send a poll subvariant sensing TF, from the AP to the STA1 and the STA2, wherein the poll subvariant sensing TF requests from the STA1 and the STA2 an availability to either send the sensing message, receive the sensing message, or both send and receive the sensing message; and wherein the AP is configured to negotiate the STA1 and the STA2 sensing roles based on the availability.

2. The AP of claim 1:

wherein the STA2 is configured to receive the sensing message and perform sensing measurement using the sensing message.

3. The AP of claim 1:

wherein the sensing message includes a null-data packet (NDP).

4. The AP of claim 3:

wherein the NDP indicates to the STA2 that a sensing measurement is in progress.

5. The AP of claim 1:

wherein the CSI from the STA2 only includes channel state information between the STA1 and the STA2.

6. The AP of claim 1:

wherein the STA1 and the STA2 are non-AP client stations.

7. The AP of claim 1:

wherein the client-to-client sounding subvariant sensing TF is received by a set of client stations that include the STA1 and the STA2.

8. The AP of claim 1:

wherein the reporting subvariant sensing TF is received by a set of client stations that include the STA2 but that do not include the STA1.

9. The AP of claim 1:

wherein the measurement report frame is sent by a set of client stations that include STA2 but that do not include STA1.

10. The AP of claim 1:

wherein the sensing message is configured to cause the AP to forward the channel state information (CSI) that characterizes the WLAN channel between the STA1 and the STA2 to a third client station (STA3).

11. The AP of claim 1:

wherein the CSI includes at least one of a channel: attenuation, propagation delay, or distortion.

12. The AP of claim 1:

wherein the client-to-client sounding subvariant sensing TF and the reporting subvariant sensing TF are indicated by a sensing trigger subtype field in a general sensing TF transmitted by the controller circuit of the AP.

13. The AP of claim 1:

wherein the client-to-client sounding subvariant sensing TF is indicated in a sensing trigger subtype field; and wherein the client-to-client sounding subvariant sensing TF assigns STA1 as a sensing transmitter using a user info field and assigns STA2 as a sensing receiver using another user info field.

14. An access point (AP) for use within a wireless local area network (WLAN), comprising:

a controller circuit configured to send a client-to-client sounding subvariant sensing trigger frame (TF) over the WLAN to first client station (STA1) and a second client station (STA2);

wherein the STA1 is configured to send a sensing message in response to receiving the client-to-client sounding subvariant sensing TF;

wherein the controller circuit is configured to send a reporting subvariant sensing TF to the STA2 after the sensing message is sent by the STA1;

wherein the STA2 is configured to send a measurement report frame to the AP in response to receiving the reporting subvariant sensing TF;

wherein the measurement report frame includes a set of channel state information (CSI) that characterizes a WLAN channel between the STA1 and the STA2; and wherein the sensing message is configured to cause the AP to forward the channel state information (CSI) that characterizes the WLAN channel between the STA1 and the STA2 to a third client station (STA3).

* * * * *